United States Patent
Shuck

(10) Patent No.: US 10,989,057 B2
(45) Date of Patent: Apr. 27, 2021

(54) COATED GAS TURBINE ENGINE COMPONENTS

(71) Applicant: Rolls-Royce Corporation, Indianapolis, IN (US)

(72) Inventor: Quinlan Y. Shuck, Indianapolis, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 137 days.

(21) Appl. No.: 16/050,934

(22) Filed: Jul. 31, 2018

(65) Prior Publication Data

US 2018/0355735 A1  Dec. 13, 2018

Related U.S. Application Data

(62) Division of application No. 14/734,834, filed on Jun. 9, 2015, now Pat. No. 10,072,506.

(Continued)

(51) Int. Cl.
*F01D 11/12* (2006.01)
*F01D 5/28* (2006.01)
(Continued)

(52) U.S. Cl.
CPC .......... *F01D 5/288* (2013.01); *B23K 35/0244* (2013.01); *B23K 35/22* (2013.01); *B23K 35/308* (2013.01); *B23K 35/3033* (2013.01); *B23K 35/3046* (2013.01); *B23K 35/325* (2013.01); *B23K 35/327* (2013.01); *C23C 24/087* (2013.01); *C23C 24/103* (2013.01); *F01D 5/20* (2013.01); *F01D 11/001* (2013.01); *F01D 11/02* (2013.01); *F01D 11/122* (2013.01); *F05D 2230/22* (2013.01)

(58) Field of Classification Search
CPC .......... F01D 5/288; F01D 5/20; F01D 11/001; F01D 11/02; F01D 11/12; F01D 11/122; B23K 35/0244; B23K 35/22; B23K 35/3033; B23K 35/3046; B23K 35/308; B23K 35/325; B23K 35/327; C23C 24/087; C23C 24/103
See application file for complete search history.

(56) References Cited

U.S. PATENT DOCUMENTS

| | | | | | |
|---|---|---|---|---|---|
| 4,548,863 | A | * | 10/1985 | Hicks | .......... C08K 7/28 428/325 |
| 4,802,828 | A | * | 2/1989 | Rutz | .......... F01D 5/20 29/889.71 |

(Continued)

FOREIGN PATENT DOCUMENTS

DE    19951143 A1    4/2001

OTHER PUBLICATIONS

Notice of Intent to Grant and Text Intended to Grant from counterpart European Application No. 15172923.3, dated Feb. 21, 2018, 22 pp.

(Continued)

*Primary Examiner* — Aaron R Eastman
(74) *Attorney, Agent, or Firm* — Shumaker & Sieffert, P.A.

(57) ABSTRACT

A gas turbine engine component may include a coating adapted to protect the component during use. The coating may be applied by sintering metallic particles to form a metallic matrix fused to the component.

5 Claims, 4 Drawing Sheets

Related U.S. Application Data

(60) Provisional application No. 62/018,914, filed on Jun. 30, 2014.

(51) Int. Cl.

| | | |
|---|---|---|
| *F01D 11/00* | (2006.01) | |
| *C23C 24/08* | (2006.01) | |
| *C23C 24/10* | (2006.01) | |
| *F01D 11/02* | (2006.01) | |
| *F01D 5/20* | (2006.01) | |
| *B23K 35/32* | (2006.01) | |
| *B23K 35/30* | (2006.01) | |
| *B23K 35/02* | (2006.01) | |
| *B23K 35/22* | (2006.01) | |

(56) References Cited

U.S. PATENT DOCUMENTS

| | | | |
|---|---|---|---|
| 6,265,022 B1 | 7/2001 | Fernihough et al. | |
| 7,282,681 B2 | 10/2007 | Kelly | |
| 7,685,711 B2 | 3/2010 | Kelly | |
| 8,039,113 B2 | 10/2011 | Kirby et al. | |
| 8,119,247 B2 | 2/2012 | Kirby et al. | |
| 8,123,489 B2 | 2/2012 | Udall et al. | |
| 2003/0126800 A1* | 7/2003 | Seth .................. | F01D 11/12 51/293 |
| 2004/0028941 A1* | 2/2004 | Lane .................. | C04B 41/009 428/689 |
| 2005/0241148 A1* | 11/2005 | Vance .................. | C04B 41/009 29/889.2 |
| 2006/0019087 A1* | 1/2006 | Mazzola ............... | C04B 41/009 428/323 |
| 2006/0251536 A1 | 11/2006 | Kelly | |
| 2007/0107216 A1* | 5/2007 | DaSilva ................. | B23P 6/005 29/889.1 |
| 2008/0083748 A1* | 4/2008 | Thyssen ................. | B22F 3/105 219/678 |
| 2008/0141825 A1 | 6/2008 | Thyssen et al. | |
| 2009/0014505 A1* | 1/2009 | Cretegny ............. | B23K 1/0018 228/248.1 |
| 2012/0219726 A1* | 8/2012 | Bayer ................... | B22F 3/1055 427/551 |
| 2013/0004328 A1* | 1/2013 | Wrabel .................. | F01D 5/288 416/241 R |
| 2014/0147242 A1* | 5/2014 | Ghasripoor ........... | F01D 11/122 415/1 |
| 2015/0315090 A1* | 11/2015 | Bruck ................. | C04B 41/4545 428/313.3 |
| 2015/0377039 A1 | 12/2015 | Shuck | |
| 2016/0326622 A1* | 11/2016 | Strock ....................... | C23C 4/06 |

OTHER PUBLICATIONS

Extended European Search Report, European Application No. 15172923.3-1362/2977560, dated Apr. 28, 2016, 10 pages.

Partial European Search Report, European Application No. 15172923.3-1362, dated Dec. 14, 2015, 6 pages.

Rustum, Roy, Agrawal, Dinesh, and Cheng, Jiping. Full Sintering of Powderered-Metal Bodies in a Microwave Field, Nature (1999) pp. 668-670. In accordance with MPEP 609.04(a), Applicant points out that the year of publication is sufficiently earlier than the effective U.S. filing date and any foreign priority date so that the particular month of publication is not in issue.

Mondal, Avijit, Agrawal, Dinesh, and Upadhyaya, An ish. Microwave Heating of Pure Copper Powder with Different Particle Size and Porosity, Department of Materials & Metallurgical Engineering Indian Institute of Technology (2009) pp. 517-520. In accordance with MPEP 609.04(a), Applicant points out that the year of publication is sufficiently earlier than the effective U.S. filing date and any foreign priority date so that the particular month of publication is not in issue.

Saitou, K. Microwave Sintering of Iron, Cobalt, Nickel, Copper and Stainless Steel Powders (2005) pp. 875-879. In accordance with MPEP 609.04(a), Applicant points out that the year of publication is sufficiently earlier than the effective U.S. filing date and any foreign priority date so that the particular month of publication is not in issue.

Prosecution History from U.S. Appl. No. 14/734,834, dated Jul. 26, 2017 through May 2, 2018, 30 pp.

Response to Canadian Office Action dated Jul. 10, 2020, from counterpart Canadian application No. 2,895,627, filed Nov. 10, 2020, 10 pp.

Office Action from counterpart Canadian Application No. 2,895,627 dated Jul. 10, 2020, 4 pp.

Office Action from Canadian couterpart application No. 2,895,627 dated Dec. 15, 2020, 4 pp.

\* cited by examiner

COATED GAS TURBINE ENGINE COMPONENTS

CROSS REFERENCE TO RELATED APPLICATIONS

This application is a divisional of U.S. patent application Ser. No. 14/734,834 filed Jun. 9, 2015, which claims the benefit of U.S. Provisional Patent Application Ser. No. 62/018,914, filed Jun. 30, 2014. The entire contents of U.S. patent application Ser. No. 14/734,834 and U.S. Provisional Application Ser. No. 62/018,914 are incorporated herein by reference.

TECHNICAL FIELD

The present disclosure relates generally to gas turbine engines, and more specifically to coating gas turbine engine components.

BACKGROUND

Rotating gas turbine engine components such as compressor blades, turbine blades, and knife seal rings spin at high speeds. Many of these components are mounted in close proximity to static components such that the components may come into contact during rotation. Coatings may be used to reduce wear to rotating and static components when they make contact with one another. Such coatings may extend the useful life of the gas turbine engine components.

Coatings used to reduce wear may be applied using electroplating and/or blown laser deposition. These techniques may be expensive and the compositions of coatings applied may be limited.

SUMMARY

The present disclosure may comprise one or more of the following features and combinations thereof.

According to an aspect of the present disclosure, a method of making a coated gas turbine engine component may include depositing a layer of powder including metallic particles and abrasive particles onto the gas turbine engine component. The method may also include applying microwaves to the layer of powder to heat the metallic particles in order to sinter the metallic particles into a metallic matrix joined to the gas turbine engine component.

In some embodiments the metallic particles may include: nickel alloys, titanium alloys, cobalt alloys, refractory metal alloys and chrome alloys. The method may further include selecting a particle size of the metallic particles such that the microwaves couple to the metallic particles. The wavelength of the microwaves may be selected such that the microwaves couple to the metallic particles. The abrasive particles may include cubic boron nitride, aluminum oxide, zirconium oxide, titanium carbide and silicon carbide. The melt temperature of the abrasive particle may be higher than a melt temperature of the metallic particles. The method further comprising applying a directed energy beam to the layer of powder to heat the metallic particles in order to fuse the metallic particles into the metallic matrix.

In some embodiments the directed energy beam may be applied after the microwaves to sinter the metallic particles into a metallic matrix and fuse the metallic matrix to the gas turbine engine. In some embodiments, the directed energy beam may be applied contemporaneously with at least a portion of the applying microwaves to the layer of powder.

According to another aspect of the present disclosure, a blade for use in a gas turbine engine is taught. The blade may include a root and an airfoil. The root may be formed to include an attachment feature adapted to mate with a central wheel to couple the blade to the central wheel. The airfoil may have a proximal end arranged to face the root and a distal tip opposite the proximal end, arranged to face away from the root. The blade may further include a coating applied to the distal tip of the airfoil to protect the distal tip during use of the blade. The coating may be applied by depositing a layer of powder including metallic particles and abrasive particles onto the distal tip of the airfoil and applying microwaves to the layer of powder to heat the metallic particles so that the metallic particles are sintered into a metallic matrix and joined to the distal tip.

In some embodiments the metallic particles may include: nickel alloys, titanium alloys, cobalt alloys, refractory metal alloys and chrome alloys. The wavelength of the microwaves may be selected such that the microwaves couple to the metallic particles. The abrasive particles may include cubic boron nitride, aluminum oxide, zirconium oxide, titanium carbide and silicon carbide.

A directed energy beam may be applied to the layer of powder to heat the metallic particles so that the metallic particles are fused into the metallic matrix joined to the distal tip of the airfoil. In some embodiments, applying the directed energy beam to the layer of powder may be performed after applying microwaves to the layer of powder. In another embodiment, the directed energy beam may be applied contemporaneously with at least some portion of applying the microwaves to the layer of powder.

According to another aspect of the present disclosure, a knife seal for use in a gas turbine engine is taught. The knife seal may include an annular runner and an annular knife ring. The annular runner may be adapted to be coupled to a static structure included in the gas turbine engine, an annular knife ring having an attachment edge adapted to be coupled to a rotor included in the gas turbine engine so that the annular knife ring rotates with the rotor and a knife ridge, opposite the attachment edge, that contact the annular runner to form a seal there between. The knife seal may also include a coating applied to the knife edge to protect the knife edge during use of the knife seal. The coating may be applied by depositing a layer of powder including metallic particles and abrasive particles onto the knife edge and applying microwaves to the layer of powder to heat the metallic particles so that the metallic particles are sintered into a metallic matrix and joined to the knife edge.

In some embodiments the metallic particles may be include: nickel alloys, titanium alloys, cobalt alloys, refractory metal alloys and chrome alloys. The wavelength of the microwaves may be selected such that the microwaves couple to the metallic particles. The abrasive particles may include cubic boron nitride, aluminum oxide, zirconium oxide, titanium carbide and silicon carbide.

A directed energy beam may be applied to the layer of powder to heat the metallic particles so that the metallic particles are fused into the metallic matrix joined to the knife edge. In some embodiments, applying the directed energy beam to the layer of powder may be performed after applying microwaves to the layer of powder. In another embodiment, the directed energy beam may be applied contemporaneously with at least some portion of applying the microwaves to the layer of powder.

In some embodiments a directed energy beam may be applied after the microwaves to sinter the metallic particles into a metallic matrix and fuse the metallic matrix to the gas turbine engine. A directed energy beam may be applied contemporaneously with the microwaves to sinter the metallic particles into a metallic matrix and fuse the metallic matrix to the knife edge.

These and other features of the present disclosure will become more apparent from the following description of the illustrative embodiments.

DETAILED DESCRIPTION OF THE DRAWINGS

Figure 2:
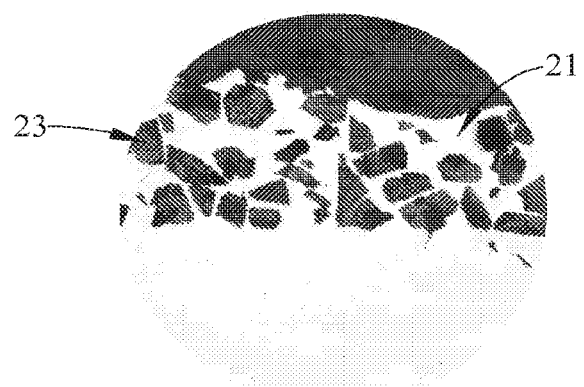
FIG. 2 is a micrograph showing the coating on the distal tip of the airfoil of FIG. 1 in which abrasive particles are suspended throughout a metallic matrix formed by microwave sintering of metallic particles.

For the purposes of promoting an understanding of the principles of the disclosure, reference will now be made to a number of illustrative embodiments illustrated in the drawings and specific language will be used to describe the same.

Figure 1:
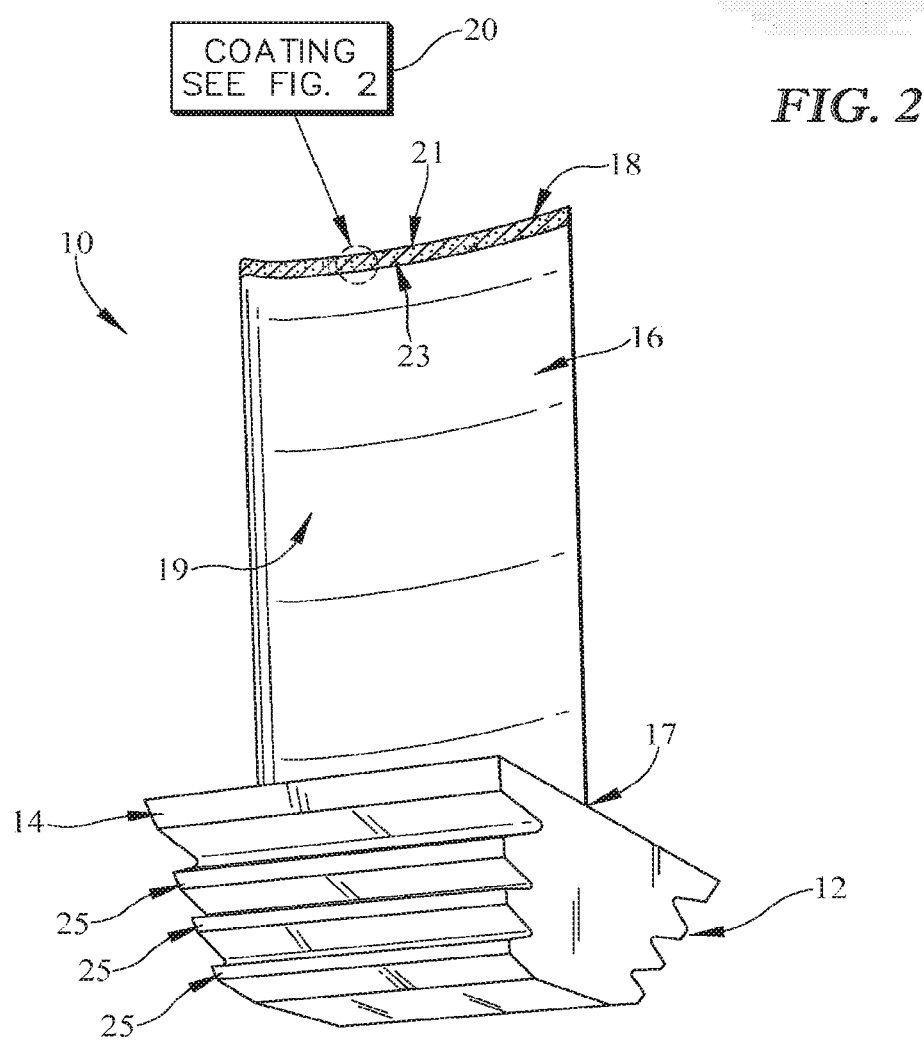
FIG. 1 is a perspective view of a blade, adapted for use in a gas turbine engine showing that the blade includes (from bottom to top) a root, a platform, an airfoil, and a coating applied to the distal tip of the airfoil to protect the distal tip during use of the blade.

A blade 10 adapted for use in a gas turbine engine and having a coating 20 is shown in FIG. 1. The blade 10 may include a root 12, a platform 14 coupled to the root 12, and an airfoil 16 coupled to the platform 14. The blade 10 may also include the coating 20 applied to a distal tip 18 of the airfoil 16 as depicted in FIG. 1.

The coating 20 may protect the distal tip 18 during use of the blade 10 in a gas turbine engine as suggested in FIG. 1. The coating 20 may illustratively include a metallic matrix 21 and a plurality of abrasive particles 23. The metallic matrix 21 may be joined to the distal tip 18 of the airfoil 16 and may suspend the abrasive particles 23 in place relative to the airfoil 16. In illustrative embodiments, the metallic matrix 21 may be formed by applying microwaves to the metallic particles arranged along the distal tip 18 of the airfoil 16 to sinter the metallic particles forming a metallic matrix 21 as suggested in FIGS. 3 and 4.

The root 12 of the blade 10 may be formed to include attachment features 25 as shown in FIG. 1. In some embodiments, the attachment features of 25 may be fir-tree-type shoulders adapted to mate with corresponding features formed in a central wheel (not shown) to couple the blade 10 to the central wheel. The platform 14 may connect the root 12 to the airfoil 16 and may separate the root 12 from the airfoil 16 so that gasses passing over the airfoil 16 are blocked from moving down around the root 12 as suggested in FIG. 1.

The airfoil 16 may include a proximal end 17, the distal tip 18, and a body 19 that extends between the proximal end 17 and the distal tip 18 as shown in FIG. 1. The proximal end 17 may be coupled to the platform 14 and may be arranged to face the root 12. The distal tip 18 may be opposite the proximal end 17 and may be arranged to face away from the root 12. The body 19 may be shaped to aerodynamically interact with gasses passing over the airfoil 16.

The metallic matrix 21 may act to hold the abrasive particles 23 in place to create an abrasive coating as depicted in FIG. 2. The metallic matrix 21 may be comprised of any number of metallic particles including but not limited to nickel alloys, titanium alloys, cobalt alloys, refractory metal alloys, and/or chrome alloys. The abrasive particle 23 to be held in place may include cubic boron nitride, aluminum oxide, zirconium, and/or titanium carbide. Another embodiment may include buoyant particles acting as the abrasive particles 23 wherein the abrasive particles 23 may be less dense than the surrounding metallic matrix 21. The abrasive particles 23 may also include hollow spherical powders where the outer shell may be denser or less dense then the metallic matrix 21.

Figure 3:
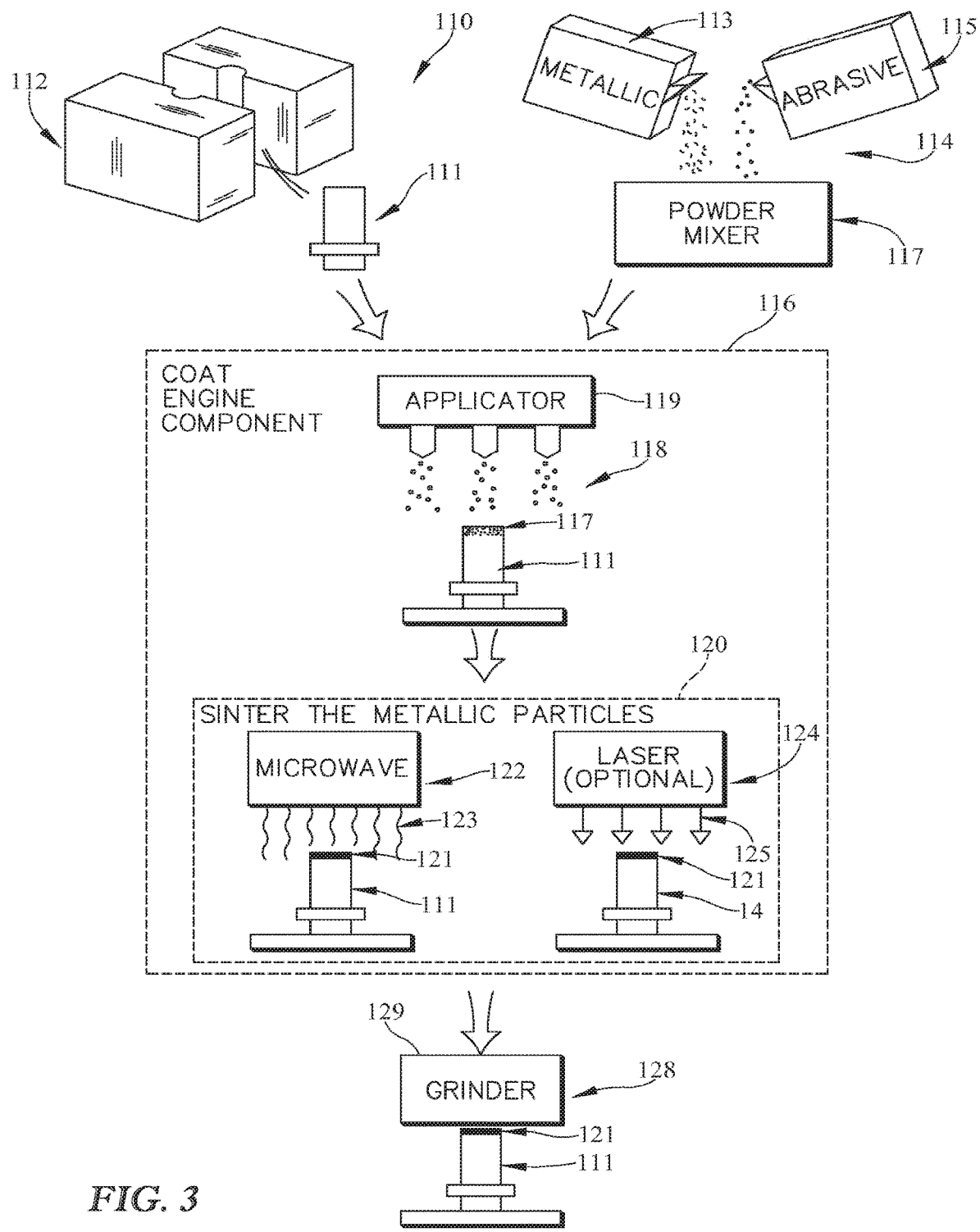
FIG. 3 is a diagrammatic illustration of a method for making a coated gas turbine engine component.
Figure 4:
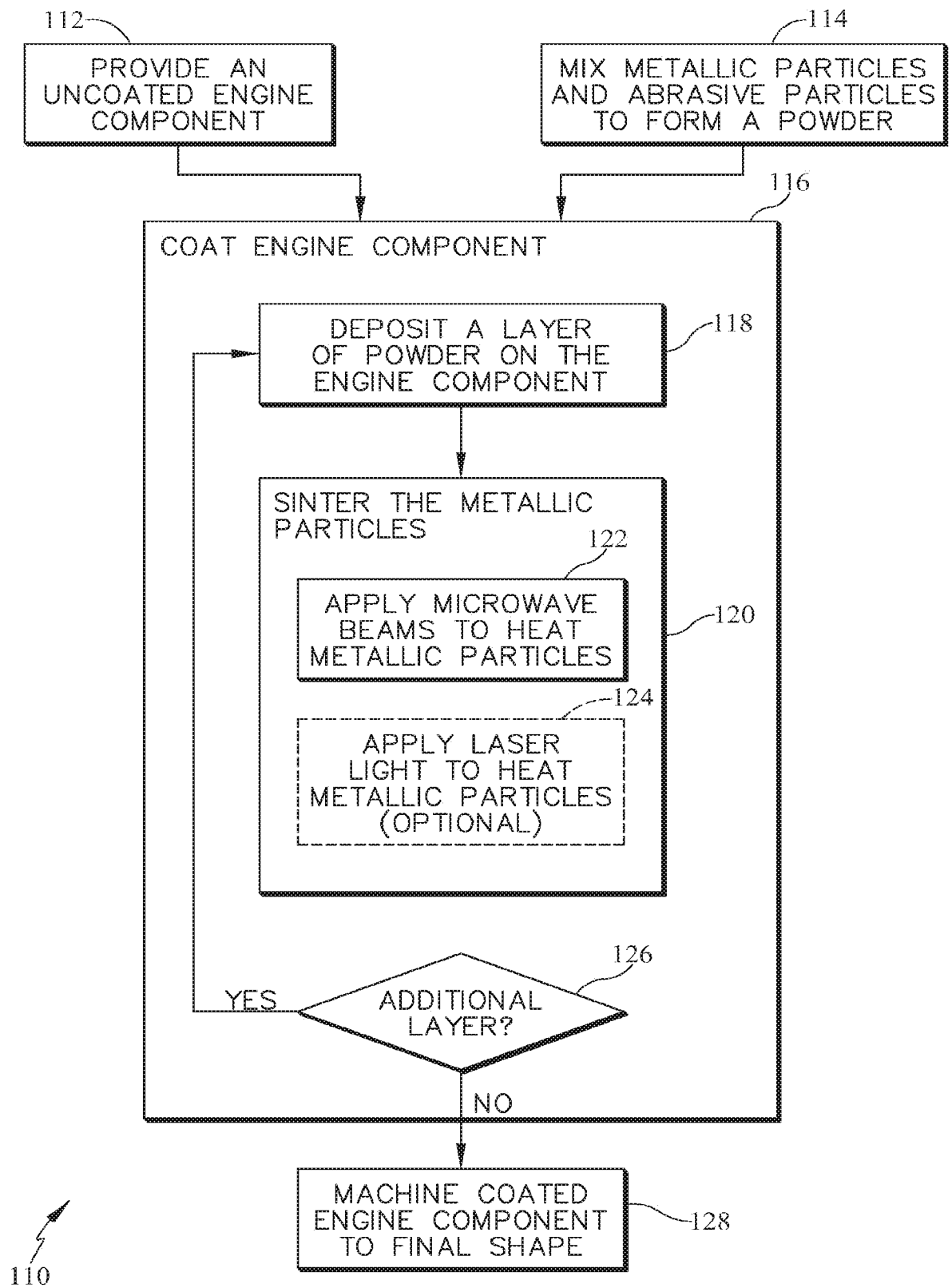
FIG. 4 is a block diagram of the method for making a coated gas turbine engine component as illustrated in FIG. 3.

One illustrative method 110 for making a coated gas turbine engine component 111, such as the blade 10 of FIGS. 1 and 2, is shown, in FIGS. 3 and 4. In a step 112 of the method 110, a gas turbine engine component 111 may be provided for coating. In another step 114, metallic particles 113 and abrasive particles 115 may be mixed to create a powder 117 used to coat the gas turbine engine component 111 as suggested in the illustrative view of FIG. 3 and in the corresponding block diagram of FIG. 4.

In illustrative embodiments, the metallic particles 113 may include and/or be selected from nickel alloys, titanium alloys, cobalt alloys, refractory metal alloys and chrome alloys. In other embodiments, the metallic particles 113 may include other metallic materials 113. The metallic particles 113 may be selected based on particulate size and ability to couple with the microwaves 123 chosen. In illustrative embodiments, the abrasive particles 115 may include and/or be selected from cubic boron nitride, aluminum oxide, zirconium oxide, titanium carbide and silicon carbide. In other embodiments, the abrasive particles 115 may include other non-metallic or metallic materials. The abrasive particles 115 and/or the microwaves 123 may be selected such that the microwaves 123 do not substantially couple to the abrasive particles 115. Thus, the microwaves 123 may not directly heat the abrasive particles 115. The volume ratio of metallic particles to abrasive particles may be between about 100:1 and about 1:10.

The method 110 may further include a sub-process 116 of coating the gas turbine engine component 111 as shown in FIGS. 3 and 4. The sub-process 116 may include a step 118 of applying the powder 117 onto the gas turbine engine component 111 using an applicator 119. The step 118 of applying the powder 117 may be performed by various methods including, but not limited to painting the powder, preplacing powder compacts with binder, and blowing the powder. Step 118 may be followed by step 120 of sintering or fusing the metallic particles 113 included in the powder 117 to create a layer of coating 121 on the gas turbine engine component 111.

The step 120 of sintering the metallic particles may include a step 122 of applying microwaves 123 onto the powder 117 to sinter or fuse the metallic particles 113 so that the metallic particles 113 form a metallic matrix. The wavelength range of the microwaves 123 may be various values, including, but not limited to, between about 1 m and about 1 mm corresponding to a frequency range between about 300 GHz and about 300 MHz. The size range of the metallic particles 113 may also vary between about 2 micrometers and about 500 micrometers. In any event, the microwave wavelength and the size of the metallic particles 113 may be selected such that the microwaves 123 couple with the metallic particles 113. The microwaves 123 may heat the metallic particles 113 to a temperature sufficient to sinter or fuse the metallic particles 113 but below the melting temperature of the metallic particles so that the metallic particles 113 do not melt. For example, the metallic particles 113 may be heated to a temperature between about 70% and about 99% of the melting temperature of the metallic particles 113. Using microwaves 123 in step 122 may allow the layer of powder 114 to be heated in a uniform manner.

Microwave heating of particles has many advantages over traditional methods of heating material. One possible advantage is the cost savings by first preheating the particulate using microwaves 123. Certain systems use a directed energy beam 125 to raise the temperature of the material from room temperature to melting. By preheating the material with microwaves 123, the directed energy beam 125 may not be used, or may only be used to raise the temperature of the material from a preheated temperature to the sintering temperature.

Another possible advantage may include more uniform distribution of heat provided by the microwaves 123, which may result in more uniform and/or better material properties such as microstructure and mechanical properties. When particles are not preheated prior to sintering, the quick melting by the directed energy beam may leave residual stresses within the article resulting in cracking.

The sintered metallic particles 113 may form a metallic matrix that may act to hold the abrasive particles 115 in place to create an abrasive coating like the coating 20 shown in FIGS. 1 and 2. In some illustrative embodiments, the step 120 of sintering the metallic particles 113 may also include an optional step 124 of applying a directed energy beam 125 to the powder 117 to heat the metallic particles 113. The microwaves 123 may heat the metallic particles 113 to a temperature sufficient to sinter the metallic particles 113 but below the melting temperature of the metallic particles so that the metallic particles 113 do not melt. In one, non-limiting embodiment, the directed energy beam may be a laser beam. In yet another, non-limiting embodiment, the directed energy beam may be an electron beam. The step 124 of applying a directed energy beam 125 to the powder 117 may be performed concurrently with the application of microwaves 123 in the step 122 and/or after the application of microwaves 123 in the step 122.

The sub-process 116 may also include a decision step 126 in which it is decided if an additional layer of coating is desired as shown diagrammatically in FIG. 4. If an additional layer of coating is desired, the sub-process 116 repeats step 118 applying powder 117 and step 120 sintering the metallic particles 113 in the powder 117. If an additional layer of coating is not desired, the sub-process 116 may proceed to a step 128 of machining the coating and/or the gas turbine engine component 111 (illustratively using a grinder 129) to finalize the shape of the coated gas turbine engine component 111.

Figure 5:
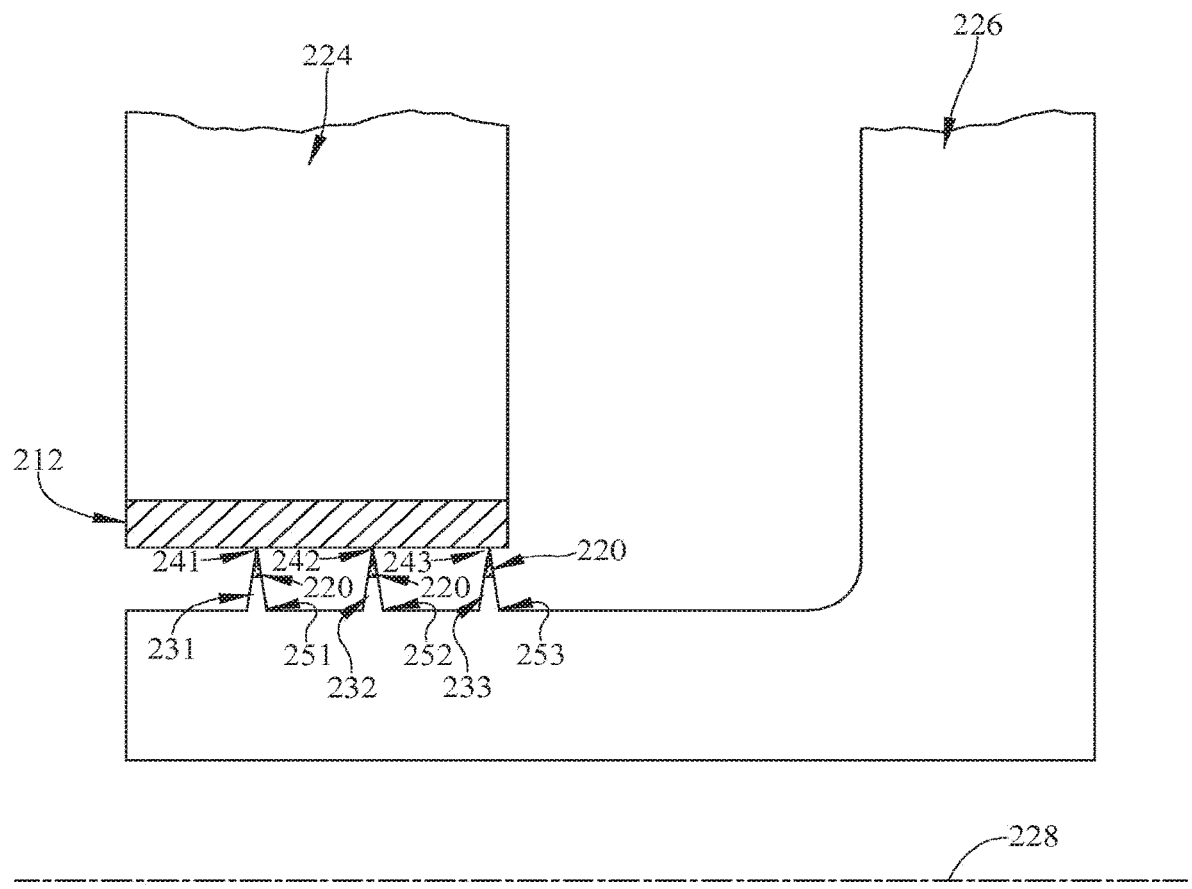
FIG. 5 is a cross-sectional view of a knife seal adapted for use in a gas turbine engine showing that the knife seal includes a coating applied to knife rings included in the knife seal.

As shown in FIG. 5, a knife seal 210 may be an example application of a coating a gas turbine engine component. In a knife seal, the annular runner 212 may be made of an abradable material. During normal operation of the gas turbine engine, the knife rings 231, 232, and 234 may come in contact with the abradable material of the annular runner 212. The contact between the knife ring and the annular runner 212 works to form a seal, effectively sealing airflow from the gas turbine engine. A coating on the knife edge 241, 242, 243 may allow the abrasive coating on the knife edge 241, 242, 243 to contact the abradable material on the annular runner 212 creating a more wear resistant seal. A more wear resistant seal will allow the part to stay in use for longer durations without needing replacement. Another possible advantage may be the uniform distribution of heat provided by the microwaves 123, which may result in more uniform and/or better material properties such as microstructure and mechanical properties. When particles are not preheated prior to sintering, the quick heating by the directed energy beam may leave residual stresses within the article resulting in cracking. Conserving the microstructure and mechanical properties of the material may also allow for less air flow creating a better seal.

The annular runner 212 may be coupled to a static structure 224 included in a gas turbine engine. The knife rings 231, 232, 233 may each have an attachment edge 251, 252, 253, opposite the knife edges 241, 242, 243. The attachment edges 251, 252, 253 may be coupled to a rotor 226 included in a gas turbine engine so that the knife rings 231, 232, 233 rotate with the rotor 226 about an axis 228 during operation of the gas turbine engine. In illustrative embodiments, the knife seal 210 may be produced using the method 110 for making a coated gas turbine engine component as described herein and shown in FIGS. 3 and 4.

A knife seal 210 adapted for use in a gas turbine engine and having a coating 220 is shown in FIG. 5. The knife seal 210 may include an annular runner 212 and a plurality of knife rings 231, 232, 233. The plurality of knife seals 231, 232, 233 may be arranged to contact the annular runner 212 to form a seal between the annular runner 212 and the knife rings 231, 232, 233 during operation of the gas turbine engine. The knife seal 210 may also include the coating 220 applied to a knife edge 241, 242, 243 of each knife ring 231, 232, 233 at the interface of the annular runner 212 and the knife rings 231, 232, 233.

The coating 220 may be similar to the coating 20 shown in FIG. 2 and may protect the knife edges 241, 242, 243 of the knife rings 231, 232, 233 during operation of the gas turbine engine as suggested in FIG. 5. The coating 220 may include a metallic matrix and a plurality of abrasive particles. The metallic matrix may be joined to the knife edges 241, 242, 243 of the knife rings 231, 232, 233 and may suspend the abrasive particles in place relative to the knife rings 231, 232, 233. In illustrative embodiments, the metallic matrix may be formed by applying microwaves 123 to metallic particles arranged along the knife edges 241, 242, 243 of the knife rings 231, 232, 233 to sinter the metallic particles into a matrix as suggested in FIGS. 3 and 4. The microwaves 123 may heat the metallic particles so that the metallic particles 113 do not melt. For example, the metallic particles 113 may be heated to a temperature between about 70% and about 90% of the melting temperature of the metallic particles 113. In one, non-limiting embodiment, the directed energy beam may be a laser beam. In yet another, non-limiting embodiment, the directed energy beam may be an electron beam.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A blade for use in a gas turbine engine, the blade comprising:

a root formed to include an attachment feature adapted to mate with a central wheel to couple the blade to the central wheel, an airfoil having a proximal end arranged to face the root and a distal tip, opposite the proximal end, arranged to face away from the root, the airfoil and the root coupled together, and an abrasive coating applied to the distal tip of the airfoil to protect the distal tip during use of the blade, wherein the abrasive coating comprises sintered metallic particles forming a metallic matrix suspending abrasive particles in place in the abrasive coating, wherein the sintered metallic particles comprise at least one of a nickel alloy, a titanium alloy, a cobalt alloy, a refractory metal alloy, or a chrome alloy, wherein the abrasive particles comprise at least one of cubic boron nitride, aluminum oxide, zirconium oxide, titanium carbide, or silicon carbide, and wherein the abrasive particles comprise hollow spherical particles.

2. The blade of claim 1, wherein the abrasive particles are less dense than the metallic matrix.

3. The blade of claim 1, wherein an outer shell of the hollow spherical particles is less dense than the metallic matrix.

4. The blade of claim 1, wherein an outer shell of the hollow spherical particles is denser than the metallic matrix.

5. The blade of claim 1, wherein the abrasive coating is formed by applying microwaves selected to couple the metallic particles and not the abrasive particles to a layer of powder including the metallic particles and the abrasive particles to heat the metallic particles so that the metallic particles are fused into the metallic matrix joined to the distal tip of the airfoil.

* * * * *